Nov. 8, 1938.  M. J. LOVELADY  2,135,587
VARIABLE RATIO ARM BRIDGE
Filed Sept. 28, 1935   2 Sheets-Sheet 1
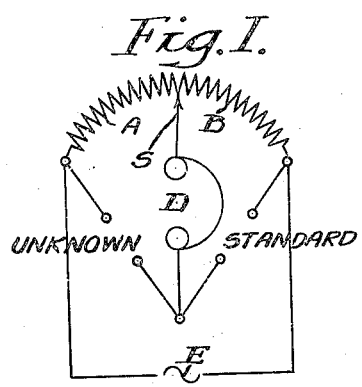
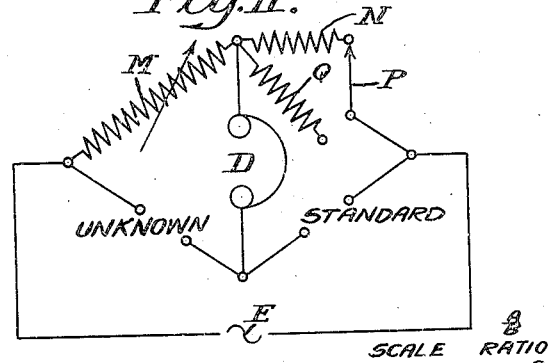
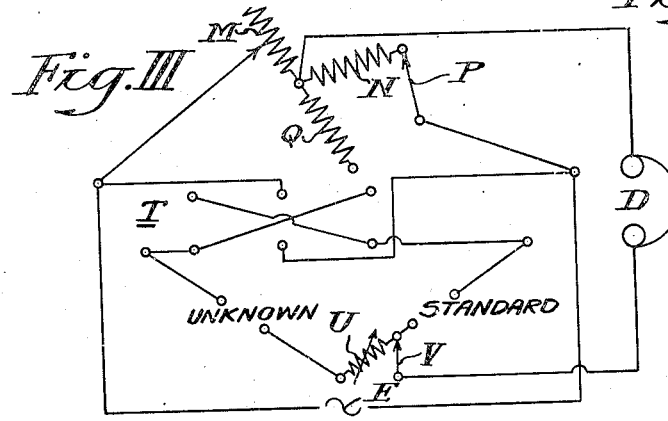
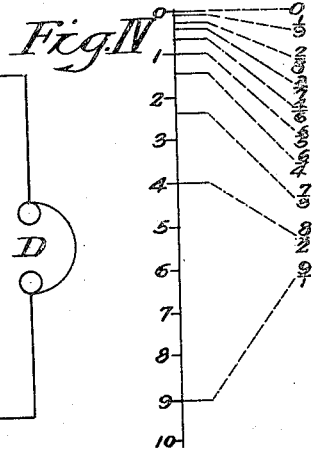
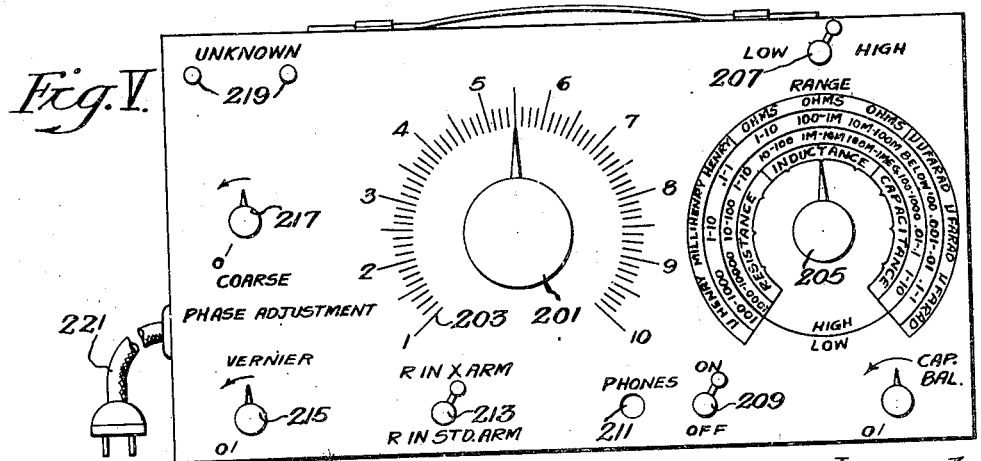

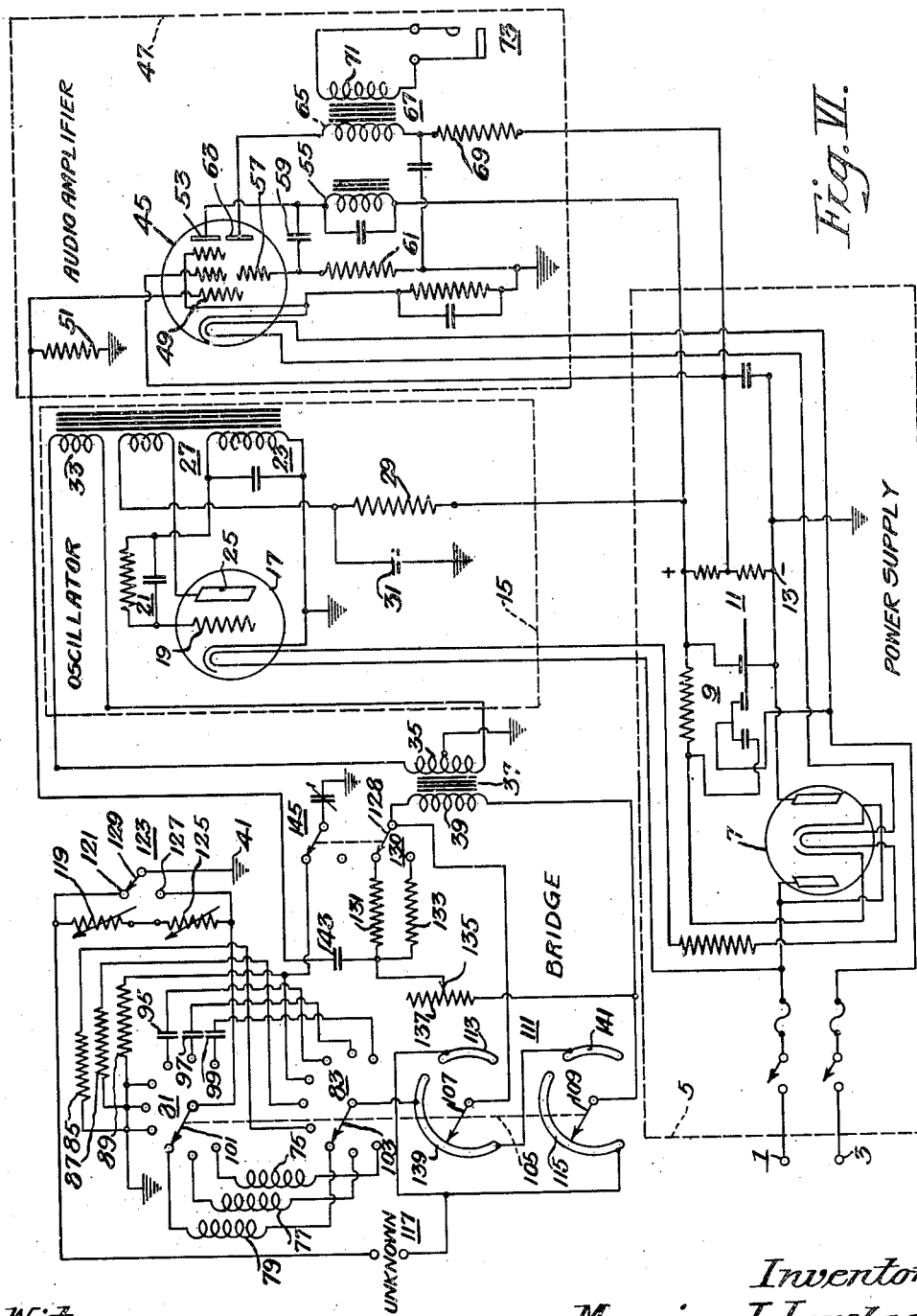

Patented Nov. 8, 1938

2,135,587

UNITED STATES PATENT OFFICE 2,135,587

VARIABLE RATIO ARM BRIDGE

Maurice J. Lovelady, Collingswood, N. J., assignor to Radio Corporation of America, a corporation of Delaware Application September 28, 1935, Serial No. 42,644

2 Claims. (Cl. 175—183)

This invention relates broadly to an instrument for measuring electrical properties. More specifically my invention is a direct reading instrument for measuring a relatively wide range of values of resistance, capacitance, or inductance.

The art of measuring electrical properties is an old one. Perhaps the most widely known instrument for measuring resistance is the Wheatstone bridge. Modifications of the Wheatstone bridge have been made to adapt it to the measurement of capacitance and inductance. Most instruments of the latter type are cumbersome, expensive and complicated. These instruments are mainly used by skilled technicians. I have overcome these difficulties by making a light, portable, inexpensive bridge which may be used to measure a wide range of electrical constants.

One of the objects of my invention is to make a small light weight portable instrument for measuring resistance, capacitance, and inductance.

Another object is to make a direct reading instrument for measuring electrical constants.

Another object is to make a direct reading instrument for measuring a very wide range of electrical properties.

A further object is to design a measuring instrument employing relatively few standards which may be selected by simple switching means.

Additional objects will appear from the accompanying specification and appended claims.

My invention may best be understood by reference to the accompanying drawings in which Figure I is a diagram of a conventional Wheatstone bridge, Fig. II is a schematic diagram of one embodiment of my invention, Fig. III is a schematic diagram of one of the switches used in combination with the circuit of my invention, Fig. IV illustrates a linear and a non-linear scale, Fig. V illustrates one form of panel which may be used, and Fig. VI is a wiring diagram of my bridge arrangement.

A conventional Wheatstone bridge as represented in Fig. I is comprised of variable ratio arms A and B which are serially connected to a standard and an unknown resistance or other electrical unit whose resistance is to be determined. An indicating device D, such as a telephone receiver or the like, is connected between the slider S and the junction of the known and unknown resistances. An alternating current E is applied across the adjustable ratio arms. If the bridge is unbalanced, the alternations of the current will be audible in the telephone receiver. The slider is moved back and forth until a null point is observed in the response of the telephone receiver.

After the balance has been obtained, as indicated by the null point, the unknown value may be determined by multiplying the known or standard value by the ratio of the bridge arms A to B. This may be expressed as follows:—

Unknown resistance =
$$\frac{A \times \text{Value of standard resistance}}{B}$$

It will be observed that the scale for the slide wire ratio is not linear. That is for small movements where A is nearly equal to B the scale will be approximately linear but as A becomes much smaller or much larger than B, the scale will become very crowded or very open. In Fig. IV an open linear scale is shown on the left and in contrast a non-linear scale of the type described above is shown on the right. The crowded scale is very undesirable and is overcome in the case of an ordinary Wheatstone bridge by employing a relatively large number of standards so the ratio arms are generally at a balance between the ratios of 4/6 or 6/4.

In Fig. II a schematic diagram indicates one form of bridge arrangement which overcomes the difficulties just described. An adjustable resistance M is used for one of the ratio arms. The other arm is composed of a fixed resistance N whose ohmic value is equal to one tenth the ohmic value of the adjustable arm M at its maximum setting. A single pole double throw switch P may be used to connect either the fixed resistance ratio arm N or another ratio arm Q whose resistance is fixed at an ohmic value equal to the ohmic resistance of the maximum setting of the adjustable arm M. If the switch P is connected to the fixed resistance arm Q of the larger ohmic value, the ratio of M to Q may be varied from .1 to 1. If the switch P is connected to the fixed resistance arm N of the smaller ohmic value the ratio of M to N may be varied from 1 to 10. Thus the use of either of two fixed arms and one variable arm will not only give a total ratio of .1 to 10 or 1 to 100 but also the ratio may be read directly on a linear scale, as shown in Figure V. Although the arrangement just described may be used in the measurement of resistance, modifications are required in the measurement of inductance or capacitance.

The reactance of a capacity, assuming a constant frequency is impressed, will vary inversely with the size of the capacity. That is, at a fixed frequency, the larger a capacity the smaller will be its reactance. If the straight direct reading bridge arrangement is employed, as just described, the balance might be made to a null point but the scale reading would be erroneous. The true reading would be the reciprocal of the scale reading. The difficulty may be overcome by reversing the relative position of the known and unknown capacitance. One simple method is to use a double pole double throw switch T as reversing means as shown in Figure III.

A capacitor or an inductor ordinarily does not offer pure reactance but has as well a finite resistance. The resistance of a capacity or inductor ordinarily broadens the balance or null point. If the resistance of the standard capacitor or standard inductor is balanced against the resistance of the unknown capacitor or unknown inductor, the effect of the two resistances will be eliminated and the capacitance or inductance may be determined by exactly balancing the bridge. Since the resistance of the standard may be greater, equal to, or less than the unknown, it is necessary to put a variable phase balancing resistor U in series with either the known or unknown. This may be accomplished with a single pole double throw switch V, as shown in Figure III. The complete wiring diagram also shows means for short circuiting the phasing resistor when the bridge is arranged for resistance measurements.

The bridge circuits described above are schematic in form. A practical alternating current bridge requires an amplifier to bring up the output to a point where telephone receivers may be used. It is customary to employ audio currents of a frequency of one thousand cycles; therefore to be complete the bridge should include an amplifier and a source of one thousand cycle alternating current. The complete circuit arrangement is shown in Figure VI.

A source of alternating current, such as 110 volts 60 cycles, is connected to the input 1, 3 of the rectifier system which is included within the broken lines 5. The rectifier is of the well known voltage doubler type. A thermionic rectifier 7 with two cathodes and two anodes is connected to a filter network 9. Across the filter network a potentiometer 11 may be connected. The negative terminal 13 of the potentiometer is grounded. This, and all grounds illustrated, are to a common chassis terminal and not to actual earth. An actual earth connection might short circuit the alternating current input line.

Within the broken line 15 a thermionic tube 17 is connected to generate oscillations of a frequency of 1000 cycles; although other frequencies may be used. The grid 19 is connected through a grid leak grid condenser combination 21 to a circuit 23 tuned to 1000 cycles. The anode 25 is coupled through the transformer 27 to the grid circuit. The resistor 29 reduces the anode voltage supplied by the rectifier to an appropriate value. The resistor 29 may be by passed by a capacitor 31. A tertiary winding 33 on the transformer 27 is connected to the primary 35 of a transformer 37, whose center tap is grounded to balance the transformer with respect to ground. The secondary 39 of the transformer supplies the alternating current for the bridge, which will be described below.

The output of the bridge is represented by a ground connection 41 and a capacitor 43 which connects the output of the bridge to the input of a two stage audio frequency amplifier. The amplifier is represented by the double purpose thermionic tube 45 and the connections within the broken lines 47. The grid, 49 which connects to the coupling capacitor 43, is returned to ground through a grid resistor 51. The anode 53 is connected through an iron core choke 55 to the positive terminal of the power supply. The grid 57 of the second amplifier is coupled to the iron core choke by a capacitor 59. The grid is returned to ground through a grid resistor 61. The output of this amplifier comprises its anode 63, the primary 65 of transformer 67, a resistor 69 and a return through the potentiometer of the power supply. The secondary 71 of the output transformer is connected to a jack 73 into which a pair of telephone receivers (not shown) may be plugged.

The bridge circuit is represented by a number of standards and the required switching means. The inductance standards consist of three inductors 75, 77, 79 which are connected to the first three contacts of the two nine position switches 81, 83.

The three resistance standards comprise resistors, 85, 87, 89 which are connected to the fourth, fifth and sixth contacts of the multi-position switches 81, 83. The three capacitance standards 95, 97, 99 are connected to the seventh, eighth and ninth contacts of the multi-position switches. The movable contact arms 101, 103 of these switches are moved with a single control 105, as are the movable arms 107, 109 of the double throw reversing switch 111. The double throw switch is used to reverse the standard and unknown connections for capacitance measurements as previously described. Two of the fixed contacts 113, 115 of the reversing switch 111 are connected to one of the terminals 117 to which the element of uknown value is to be connected. The other of the terminals 117, is connected to the variable phasing resistor 119 and to the fixed contact 121 of the single pole double throw switch 123. The second variable phasing resistor 125, is a vernier, which is used for fine adjustment and is serially connected to the first variable resistor 119. The remaining fixed contact 127 of the single pole double throw switch is connected to the lower terminal of the vernier phasing resistor 125 and the movable contact arm 101 of the multi-position switch 81. The movable contact 129 of the single pole double throw switch is connected to ground.

The ratio arms of the bridge are composed of either of two fixed resistors 131, 133, which are similar to N and Q in Figures II and III. These resistors are connected together and to the slider 135 of the variable resistor arm 137. The junction of the fixed resistors and the slider is connected to the coupling capacitor 43 which is connected to the input of the audio amplifier. The voltage input to the bridge is represented by the secondary 39 of the balanced transformer 37. The secondary is connected to the movable contact 128 of the single pole double throw switch 130 and to the fixed terminal of the variable resistor 137. The secondary is also connected to the movable contact arms 107, 109 of the double throw double pole switch 111. The remaining fixed contacts of the double pole double throw switch are connected together. The movable contact 103 of the lower multi-position switch 83 is connected to the fixed contact 139 of the double pole double throw switch.

It should be noted that the movable contacts of the double throw reversing switch and the movable contacts of the multi-position switches are operated with a uni-control. To avoid difficulties the double throw reversing switch has contact arrangements which automatically operate when the switch is positioned for capacitance readings. A second switch 145 is operated in conjunction with the single pole double throw ratio arm switch 130. This switch 145 connects a small variable capacitor between the high potential terminal of the highest valued standard resistor and ground. The small variable capacitor is only used when resistances of very high value are being measured. A high resistance in the unknown arm may have a substantial capacity reactance to ground which would unduly broaden the null point. This may be balanced out by adjusting the small variable capacitor. By the way of example, I shall give a table of values of the several elements of the bridge. It should be understood that other constants may be used, but I have found the following useful over a vary wide range of values:

| | |
|---|---|
| Standards of inductance | 1 henry |
| | 10 millihenries |
| | 1000 microhenries |
| Standards of capacitance | 1 microfarad |
| | .01 microfarad |
| | .0001 microfarad * |
| Standards of resistance | 10 ohms |
| | 1000 ohms |
| | 100000 ohms |
| Fixed ratio arms | 1000 ohms |
| | 10000 ohms |
| Variable ratio arm | 1000–10000 ohms |
| Phasing resistors coarse | 10000 ohms |
| Phasing resistors vernier | 55 ohms |
| Balancing capacity | 10–285 micromicrofarads |

* Partly inherent capacity.

With the above standards and variable ratios, resistances from 1 to 1,000,000 ohms, inductances from 100 microhenries to 10 henries, and capacities from 1 micromicrofarad to 10 microfarads may be measured and their values determined directly from the variable resistor arm scale.

The entire device may be assembled within a small portable case 9¾ inches long, 6½ inches high, and 4½ inches deep. The total weight is about 5½ pounds. The front panel of the case is shown in Figure V. The adjustable ratio arm pointer 201 with its linear scale 203 is shown in the central portion of the illustration. The control knob 205 connects to the nine position switch. The double throw switch 207 in the upper right hand corner is the ratio selector switch. The small knob in the lower right is the control for the variable capacitor which is used to balance out the capacity reactance of high resistances. To the left of this small control knob and in the following order are the off-on switch 209, the phone jack 211, the double throw switch 213 for placing the phasing resistors in the standard or unknown arms, and the knob 215 for the vernier phasing resistor. Immediately above the vernier phasing adjustment knob, is the control knob 217 for the coarse phasing adjustment. In the upper left hand corner of the panel are two binding posts which are the terminals 219 for the unit of unknown value. The power supply is represented by a cord and plug 221.

The method of using the bridge is as follows: An unknown resistance is connected across the unknown terminals, the ratio selector switch is placed on "Low", the nine position selector switch is placed on the lowest value of resistance (1-10), and the variable ratio arm is moved slowly from 1-10. The response in the telephone receivers will be a 1000 cycle note which will disappear or become a null at the balance point and will increase in intensity on either side of the balance point. If no balance is found on this scale the ratio selector switch is turned to high and the variable ratio arm adjusted for a balance. If a balance is found on this range the value of the unknown resistance will be from 10 to 100 ohms and will be ten times the scale reading at the balance point. If the unknown resistor has an ohmic value greater than 100, the above described operation is repeated on the higher resistance standards until a balance is found.

The measurement of inductance is performed in substantially the same manner. The only difference is that the resistance component of the inductor must be balanced out by adjusting the phasing resistors. The usual method is to move the variable resistor arm to an approximate balance position and then move the coarse phasing adjustment to balance out the residual 1000 cycle note. The final adjustment results from successive adjustments of the vernier phase control and the variable ratio arm. At the exact balance point the residual 1000 cycle note will disappear and a true zero response will be found.

Capacity is measured in accordance with the procedure for measuring inductance. However, one additional step is required. There is a small amount of inherent capacity in the terminals and leads. This value is usually 25 to 30 micromicrofarads. The unknown terminals are left open and the bridge is carefully balanced. The reading for the balance is the inherent capacity which must be subtracted from the final reading which is obtained after the unknown capacitor has been connected and balanced.

I have described a compact, self-contained portable bridge. Its accuracy will be determined largely by the precision of its standards and the care with which the variable ratio arms are chosen. Accuracy within about 2% is well within practical design. The bridge lends itself to ready measurements within a wide range of values of resistance, inductance or capacitance. The foregoing description, constants and circuits are merely by way of example. Those skilled in the art will find numerous modifications within the scope of my invention which is only limited by the prior art and the appended claims.

I claim as my invention:—

1. In a portable measuring device of the Wheatstone bridge type, the combination which includes a continuously variable resistor operable in cooperation with a linear scale, a first and a second fixed resistance, a first switch for selectively connecting one of said fixed resistors to said variable resistor whereby said variable and said selectable fixed resistors form the conjugate variable arm and ratio arm of said bridge respectively; a plurality of standards of known values of resistance, capacitance, and inductance, a second switch to select one of said standards, terminal connections for an unknown capacitor, resistor, or inductor which is to be measured, connections including a reversing switch whereby said unknown and said standard are serially connected across said variable arm and said ratio arm to form the remaining two conjugate arms of said bridge, said reversing switch being operably connected to said second switch whereby the selection of a capacitive standard automatically reverses the relative position of said standard and said unknown; a second variable resistor, and a third switch whereby said second variable resistor may be connected in series with said standard or said unknown; a variable capacitor, a fourth switch, and connections whereby said fourth switch connects said variable capacitor across at least one of said resistance standards to thereby permit the inherent shunt capacitance across high resistances which are to be measured to be balanced out; means for energizing said bridge, and means for indicating a balance.

2. A device of the character described in claim 1 which is further characterized in that said means for energizing said bridge is an audio frequency vacuum tube oscillator.

MAURICE J. LOVELADY.